(12) United States Patent
Auyeung et al.

(10) Patent No.: US 7,065,546 B2
(45) Date of Patent: Jun. 20, 2006

(54) METHOD OF PERFORMING QUANTIZATION WITHIN A MULTIMEDIA BITSTREAM UTILIZING DIVISION-FREE INSTRUCTIONS

(75) Inventors: Cheung Auyeung, Sunnyvale, CA (US); Huipin Zhang, Milpitas, CA (US)

(73) Assignees: Sony Electronics Inc., Park Ridge, NJ (US); Sony Corporation, Tokyo (JP)

( * ) Notice: Subject to any disclaimer, the term of this patent is extended or adjusted under 35 U.S.C. 154(b) by 681 days.

(21) Appl. No.: 10/120,210

(22) Filed: Apr. 9, 2002

(65) Prior Publication Data

US 2003/0191788 A1    Oct. 9, 2003

(51) Int. Cl.
*G06F 7/52* (2006.01)

(52) U.S. Cl. .................................................... 708/650

(58) Field of Classification Search ........ 708/650–656, 708/502
See application file for complete search history.

(56) References Cited

U.S. PATENT DOCUMENTS

| | | | | | |
|---|---|---|---|---|---|
| 4,823,301 | A | * | 4/1989 | Knierim ..................... | 708/650 |
| 4,979,139 | A | * | 12/1990 | Nakayama .................. | 708/650 |
| 4,991,132 | A | * | 2/1991 | Kadota ....................... | 708/654 |
| 5,274,580 | A | * | 12/1993 | Keryvel et al. ............. | 708/653 |
| 5,309,393 | A | * | 5/1994 | Sakata et al. .......... | 365/189.01 |
| 5,818,744 | A | * | 10/1998 | Miller et al. ................ | 708/654 |
| 5,818,745 | A | * | 10/1998 | Sheaffer ..................... | 708/656 |
| 5,881,177 | A | * | 3/1999 | Kim ............................ | 708/654 |
| 6,240,338 | B1 | * | 5/2001 | Peterson ..................... | 708/654 |
| 6,260,054 | B1 | * | 7/2001 | Rosman et al. ............. | 708/502 |
| 6,587,590 | B1 | * | 7/2003 | Pan ............................. | 708/402 |
| 6,598,065 | B1 | * | 7/2003 | Harrison ..................... | 708/654 |
| 6,832,232 | B1 | * | 12/2004 | Hus et al. ................... | 708/401 |
| 2003/0105788 | A1 | * | 6/2003 | Chatterjee .................. | 708/402 |

OTHER PUBLICATIONS

Masayuki et al., Efficient initial approximation for multiplicative division and square root by a multiplication with operand modification, Apr. 1997, IEEE Transactions on Computers, vol. 46, No. 4, pp. 495-498.*
Robert, Integer Division Using Reciprocals, 1991, IEEE, pp. 186-190.*

* cited by examiner

*Primary Examiner*—Kakali Chaki
*Assistant Examiner*—Chat C. Do
(74) *Attorney, Agent, or Firm*—John P. O'Banion

(57) ABSTRACT

Methods for enhancing the performance of quantization operations by converting division operations to a combination of multiplication and shift operations, which are preferably performed on a processor supporting single-instruction multiple-data (SIMD) instructions. A table of mantissa and exponent values is created for a sufficient range of values for 1/a. During quantization, the mantissa and exponent values are found in the table 1/a for associated with a given quantization division operation given by b/a which is found according to the formula $b/a=(b \times A)>>n$. Aspects are described for application to processors that do not support non-uniform shift operations, and for reducing the necessary bit-width of the operations to increase efficiency. The quantization method may be applied to protocols such as MPEG-2 and other similar formats.

23 Claims, 3 Drawing Sheets

US 7,065,546 B2

METHOD OF PERFORMING QUANTIZATION WITHIN A MULTIMEDIA BITSTREAM UTILIZING DIVISION-FREE INSTRUCTIONS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM APPENDIX

Not Applicable

BACKGROUND OF THE INVENTION

1. Field of the Invention

This invention pertains generally to quantization within multimedia bit-streams, and more particularly to a method of performing quantization without utilizing division instructions.

2. Description of the Background Art

Quantization is performed within multimedia bit-streams, such as MPEG-2, and protocols having a similar architecture, to convert a block of discrete transform (DCT) coefficients into integers by dividing quantizer step sizes. Applications for quantization include an assortment of video post-processing equipment for the display of digital video signals. The quantizer step sizes in the block are specified by two elements: (1) a weighting matrix that is utilized to modify the step sizes within a block, and (2) a scale factor that is utilized to modify the step sizes at the cost of only a few bits, which is in contrast to the encoding of an entirely new matrix. Corresponding to the two elements specified by the quantizer step size, two separate steps are contained in the implementation of the MPEG-2 quantizer, and both steps involve an integer division which is the toward-zero integer truncation of the corresponding floating-point division. It will be appreciated that in terms of processor bandwidth, integer divisions are expensive operations in relation to other instructions, such as shift, multiply, and so forth. Furthermore, it is difficult to implement quantizers for MPEG-2, and similar protocols, which take full advantage of available SIMD instructions while providing accurate results.

Therefore, a need exists for a quantization method that efficiently executes on processors having SIMD, or similar, architectures without sacrificing the precision of the result. The present invention satisfies those needs, as well as others, and overcomes the deficiencies of previously developed solutions.

BRIEF SUMMARY OF THE INVENTION

The present invention provides a method for efficiently implementing high precision MPEG-2 quantization without the necessity of utilizing integer divisions. The present invention generally allows the conversion of integer divisions into integer multiplications. Preferably, the multiplications are performed within a given SIMD processor utilizing non-uniform shifting, although a technique is described for executing non-uniform shifts utilizing an SIMD uniform shift instruction within a processor that does not provide non-uniform shift instructions. In addition, a method is described for representing the generated data to provide for an efficient implementation of the integer multiplication. The present invention may be utilized for quantization within a number of applications, and is particularly well-suited for use with MPEG-2 bit-streams and variations thereof.

An object of the invention is to increase the efficiency with which quantization is performed on processors having an SIMD, or similar, architecture.

Another object of the invention is to provide quantization that can attain high levels of precision.

Another object of the invention is to provide quantization that efficiently utilizes SIMD instructions.

Another object of the invention is to eliminate the overhead associated with division operations during quantization.

Another object of the invention is to provide a quantization method that may be utilized with MPEG-2 and similar protocols.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus, systems and/or methods generally shown in FIG. 1 through FIG. 5. It will be appreciated that the apparatus and systems may vary as to configuration and as to details of the components, and that the methods may vary as to the specific steps and sequence, without departing from the basic concepts as disclosed herein.

The present invention provides for the replacement of overhead-intensive division instructions with operations that are more readily computed, especially within processors having SIMD instructions. A division operation, given by b/a, utilized during quantization relates a given integer a and any given integer b belonging to a fixed integer set S. The present invention appreciates that the division of dividend b by divisor a, may be alternatively arrived at during quantization using a combination of multiplication and shifting operations. The scalar values for the multiplication and shifting are based on a table lookup of mantissa A and exponent n values derived according to the value 1/a created over the desired range of integer values for a. In other words, mantissa A and exponent n are functions of a, and we represent them as A(a) and n(a) when we want to explicitly illustrate their dependency on a.

During quantization, a specific integer a value for the division b/a is used to look up the integer values A and n from a pair of pre-determined tables. After which, the value b/a is computed by using a multiply instruction and a right-shift instruction (>>) according to the following relation:

$$b/a = (b \times A) >> n \tag{1}$$

The same procedure can be applied to an arbitrary integer a to convert any integer division within a quantization operation to an integer multiplication. The table containing mantissa A(a) and exponent values n(a) for all possible value of a for a given application are created prior to performing any quantization.

Figure 1:
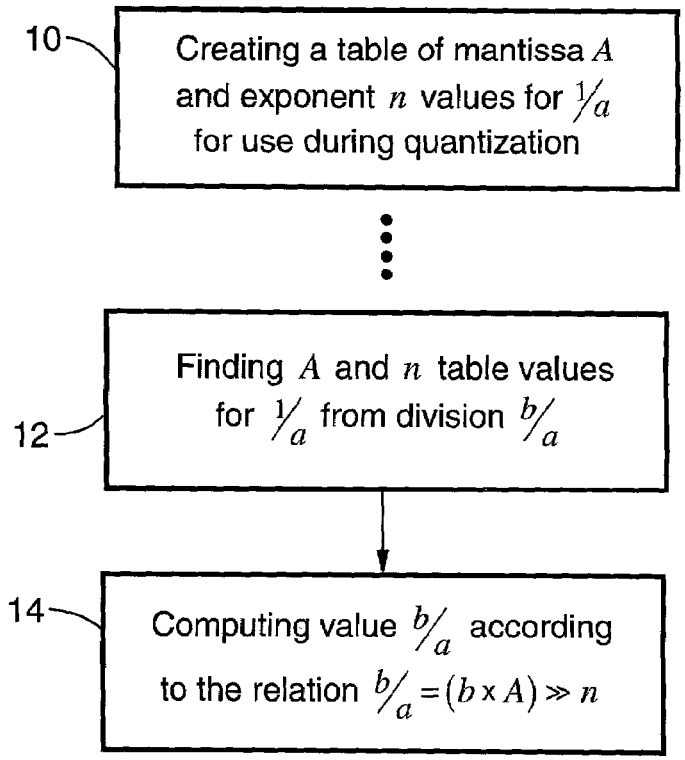
FIG. 1 is a flowchart of converting division operations during quantization according to an embodiment of the present invention, shown for use on processors which provide non-uniform shift instructions.

FIG. 1 depicts the general flow of the conversion method for use on processors which support a non-uniform shift instruction. The table of mantissa and exponent values for a range of values 1/a is shown being created prior to quantization in block 10. The tables created in block 10 are then utilized during quantization by first finding the mantissa A and exponent value n for a given 1/a within the given division b/a, or equivalent, that needs to be computed during quantization as depicted in block 12. Finally, the resulting value b/a is computed according to the relation of Eq. 1 as per block 14.

The method may be applied to MPEG-2 quantization, wherein the two integer divisions c=b/a and f=e/d are related, such that integer b depends on DCT coefficients, integer a represents elements of a weighting matrix, integer d represents quantizer scales, and integer e depends on the quotient c. The method of converting integer divisions to integer multiplications is preferably adapted slightly, with the intent that for given integers a, b, and d; the integer f which results from the converted integer multiplication should be identical to that which are obtained from the integer divisions, regardless of whether the integer c has changed. It will be appreciated that in this case both integers a and d belong in the set [1,255], and thereby 1/a, 1/d, belong on the same range, wherein it is possible to utilize one pair of tables for executing both conversions.

The mantissa table and the exponent table is generated by a search. Let m be the number of bits for representing A(x) for any x∈[1,255] as a binary number. Let the normalized fraction F∈[0.5,1) and the integer exponent E of 1/x be the unique representation of 1/x such that $1/x = F \times 2^E$. Then, A(x) is defined as the smallest integer which is bigger than or equal to $2^m \times F$, while n(x) is defined as m−E.

Starting with a small integer m, we incrementally search for the smallest positive integer m and its associated mantissa table A(x) and exponent table n(x) such that the two divisions c=b/a and f=e/d are correct for any possible DCT coefficient in b, such as within the range from −2048 to 2047, and any possible value of quantizer scale in d. For MPEG-2, the table search is terminated for the present embodiment when m is equal to eighteen. In particular, for x∈[1,255], we have −7≤E(x)≤1, and therefore:

$$17 \leq n(x) \leq 25 \tag{2}$$

SIMD instructions operates on multiple data in a data packet in parallel with the same operation. Quantizer implementation using SIMD are generally straightforward after the mantissa and exponent tables have been constructed. As a consequence of the elements within the exponent table not being identical, the amount of right shift in Eq. 1 for multiple data may be different. For SIMD operation of multiple data by Eq. 1 in parallel, an instruction is needed to perform non-uniform logical right shift on multiple data, wherein the different shifts may be performed for each data element within the packet data.

It will be appreciated that an aspect of the present invention provides for the effective generation of non-uniform shifting within architectures that do not provide non-uniform shift instructions, by modifying the mantissa table and making the shift operations responsive to the maximum of the numbers within the exponent table as follows. Let p be a maximum of the numbers within the exponent table such that:

$$p = \max_{i \in [1,255]} \{n(i)\}$$

After looking up the value of 1/a from the tables the division is converted according to the following relation, $$b/a = (b \times (A << (p-n))) >> p \tag{3}$$

wherein the value p is a predetermined constant prior to any quantization, which for the described embodiment is 25. Our present embodiment implements Eq. (3) as $$b/a = (b \times M) >> p \tag{4}$$

wherein the predetermined lookup table M is derived from the lookup table A and n such that for any x∈[1,255], $$M(x) = (A(x) << (p-n(x))) \tag{5}$$

where the bit width of the table M is 26. This is because A(x) is 18 bits, p=25, and from Eq. 2, the minimum value of n(x) is 17. The left shift of an 18 bit number A(x) by 25−17=8 bits results in a 26 bits number.

The equation, Eq. 4, indicates that by modifying the mantissa table as per Eq. 5 the lack of non-uniform shift instructions does not prevent utilization of the technique according to the present invention.

Figure 2:
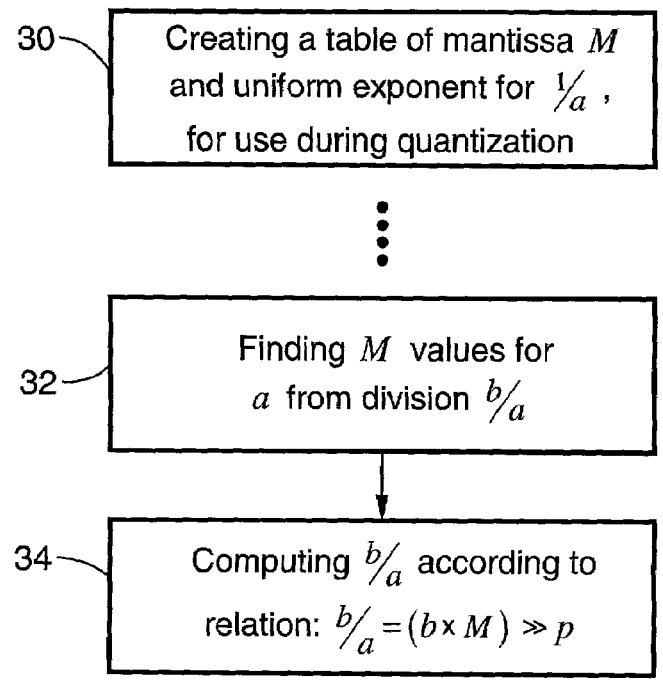
FIG. 2 is a flowchart of converting division operations during quantization according to another embodiment of the present invention, shown for use on processors that do not provide non-uniform shift instructions.

FIG. 2 illustrates the general flow of the method for use on processors that do not support non-uniform shift instructions. The table of mantissa values and uniform exponent values p are constructed for 1/a for the application prior to quantization as per block 30. It should be appreciated that the construction of a table could be performed in conjunction with the quantization operations, however, for the sake of efficiency, it is far preferable that the table be constructed at some time prior to its use. The mantissa M values are found within the table for a given a value for a division b/a, e/d, or equivalent, as shown in block 32. Finally the value b/a, e/d, or equivalent, may be computed according to the relation b/a=(b×M)>>p given in Eq. 4, as depicted in block 34 wherein p=25, or approximately 25. It will be appreciated that the number of bits values, such as p, may be variously implemented using different numbers of bits without departing from the teachings of the claimed invention.

An issue that effects the resulting efficiency of the present method relates to the representation of the data for SIMD operation of 16 bits operands. It will be appreciated, however, that the numbers in the modified mantissa table M defined in Eq. 5 have 26 valid bits, thus they exceed the range of signed 16-bit integers. As a consequence, the SIMD implementation of Eq. 5 cannot be performed at the level of a 16-bit integer. One method of resolving the issue is to represent both DCT coefficients and mantissa table elements as 32-bit integers, although the efficiency of the algorithm is significantly decreased.

Another aspect of the present invention, therefore, is a method for representing any element within the mantissa table utilizing two 16-bit integers. As a result of which the multiplication of a 16-bit integer with a 32-bit integer is converted into two multiplications of two 16-bit integers and an integer left-shift operation. In particular, let $M_0(x)$ contain the least significant 15 bits of $M(x)$ and $M_1(x)=M(x)>>15$ then M can be expressed in the form $$M(x)=(M_1(x)<<15)+M_0(x) \quad (7)$$

where $M_1(x)$ and $M_0(x)$ are two 16-bit signed integers, and from Eq. 4 it follows that $$b/a=(b \times M_1+(b \times M_0)>>15)>>(p-15) \quad (8)$$

When implemented, the numbers $M_0$ and $M_1$ are tabulated separately into two tables of 16 bit signed integers.

Figure 3:
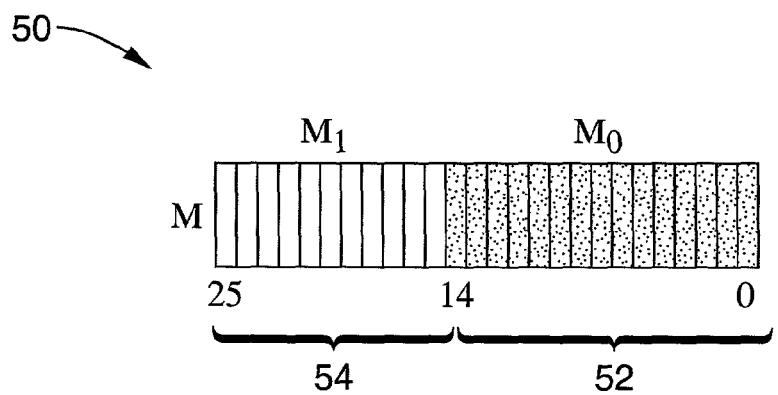
FIG. 3 is a representation of a 26-bit integer using two 16-bit integers according to an aspect of the present invention, in which the necessary bit-width of the operations may be reduced.

FIG. 3 illustrates a 26 bit integer field 50 representing a 32-bit integer using two 16-bit integers as a combination of $M_0$ 52 of fifteen bits length, and $M_1$ 54 of eleven bits.

Figure 4:
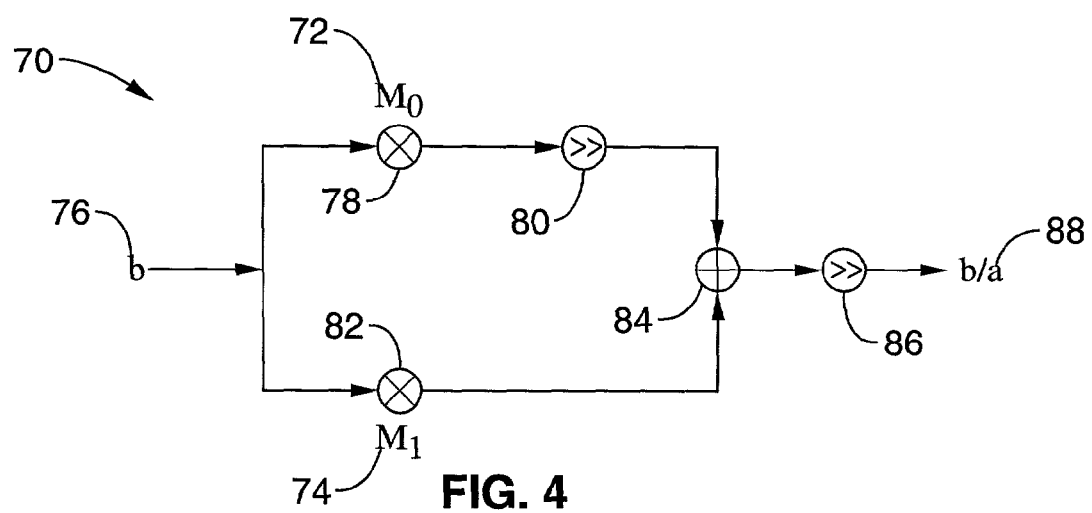
FIG. 4 is a schematic of performing integer division utilizing multiply instructions according to an embodiment of the present invention, wherein a reduction in bit-width is accomplished by splitting the multiply operations.

FIG. 4 depicts an embodiment 70 of the described method for reducing the resultant integer width which converts a division into five SIMD instructions comprising two multiply instructions, two right shift instructions, and one addition. Two mantissa tables $M_0$ 72 and $M_1$ 74 are created in accordance with the value 1/a. In converting the division b/a the multiplication of b 76 is split, wherein a multiplication 78 with a logical right shift 80 is executed in combination with a multiplication 82. The results of the multiplications are summed 84 and then right shifted 86 to generate the result b/a 88 without the use of a division instruction.

Figure 5:
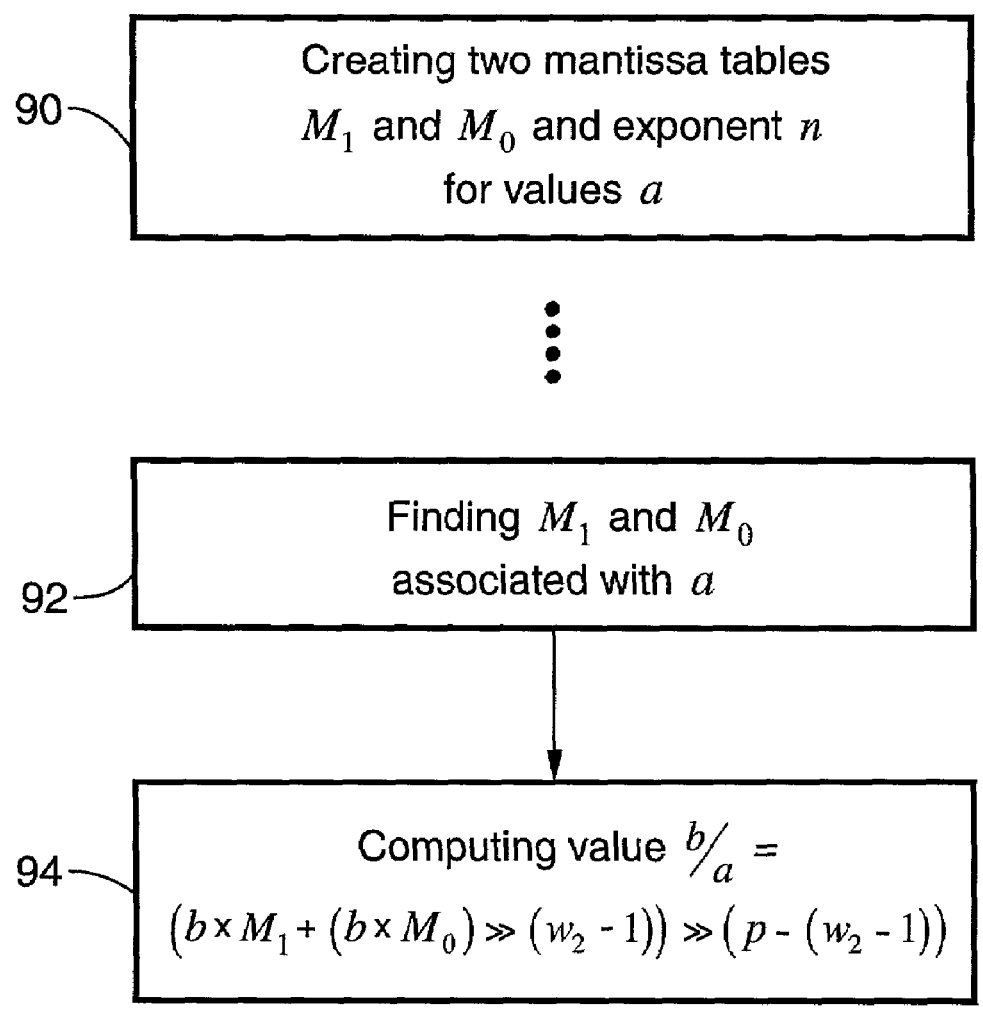
FIG. 5 is a flowchart of converting division operations during quantization according to another embodiment of the present invention, shown for reducing the necessary bit-width of the operations.

FIG. 5 illustrates a generalized flowchart of the method for converting division operations b/a within a quantization operation and providing for the use of reduced bit-width operations. The target width of the mantissa tables and operations would conventionally be given as a target first width $w_1$ which by the use of the split multiply operations is narrowed to a second width $w_2$. The prior examples describe a case in which the first target width $w_1$ is given by 32 bits, while the second width $w_2$ comprises 16-bit values within the tables according to the present invention. The equation is given by the relation:

$$b/a=(b \times M_1+(b \times M_0)>>(w_2-1))>>(p-(w_2-1)) \quad (9)$$

The two mantissa tables for $M_1$ and $M_0$ are shown being created in block 90, which is preferably performed off-line in preparation for performing quantization operations. It will be appreciated that the table values, as in the other embodiments of the present invention, may be contained in either volatile, or non-volatile, memory. During quantization operations on the multimedia stream, the values for $M_1$ and $M_0$ are looked up in the tables for 1/a, or equivalent, as per block 92. Finally, the division operation is converted with multiplication, shift, and addition operations according to Eq. 9 as shown in block 94, and the operations utilized require a narrower second bit-width $w_2$, than would be required if the multiplication operations were not split between $M_1$ and $M_0$.

Accordingly, it will be seen that this invention provides a method for performing quantization, such as in the case of the MPEG-2 multimedia protocol, without the burdensome division overhead normally associated with quantization. The method replaces the division instructions with operations more readily executed on a processor configured with an SIMD, or similar, architecture. It will be appreciated that the method provides a broadly applicable approach to increasing the speed with which quantization may be performed, and the examples of the described approach may be adapted through a number of variations by one with ordinary skill in the art without departing from the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of converting a block of discrete cosine transform (DCT) coefficients into integers by dividing quantizer step size without using division operations during quantization of a multimedia bit-stream executed within a processor having single instruction multiple data (SIMD) instructions, comprising:
    constructing a look-up table M for a range of quantization step values 1/a;
    loading data for SIMD instructions to operate on multiple data in a data packet in parallel within the same operation for executing the following steps;
    looking up in said look-up table M an integer value associated with a particular value of quantization step size 1/a for each element in the block;
    performing integer multiplication for each integer b within the block of fixed integer set S and mantissa A using said SIMD instructions; and
    executing an integer shift operation for each integer in a resultant block of data by right-shifting to arrive at an integer solution block solving for b/a;
    wherein said quantization comprises two integer divisions c=b/a and f=e/d in which integer b depends on discrete cosine transform (DCT) coefficients, integer a represents elements of a weighting matrix, integer d represents quantizer scales, and integer e depends on the quotient c.

2. A method as recited in claim 1, wherein on processors having SIMD instructions configured for performing non-uniform shifting operations, conversion speed is enhanced by executing non-uniform SIMD right shifting of each integer in the resultant block of data by n places in response to values within look-up table M.

3. A method as recited in claim 1, wherein on processors having SIMD instructions not configured for performing non-uniform shifting operations, said integer-shift operation comprises:

modifying said table M into a set of mantissa A values subject to a fixed exponent, by left shifting each mantissa A entry by an amount equal to p−n wherein p is a constant and n is the original exponent value; and executing said shift operations, after said integer multiplication, during said quantization by performing an integer right shift for each integer in the resultant block of data by a fixed number of places p.

4. A method of converting a block of discrete cosine transform (DCT) coefficients into integers by dividing quantizer step size without using division operations during quantization of a multimedia bit-stream executed within a processor having single instruction multiple data (SIMD) instructions, comprising:

constructing a look-up table M for a range of quantization step values 1/a;

loading data for SIMD instructions to operate on multiple data in a data packet in parallel within the same operation for executing the following steps;

looking up in said look-up table M an integer value associated with a particular value of quantization step size 1/a for each element in the block;

performing integer multiplication for each integer b within the block of fixed integer set S and mantissa A using said SIMD instructions;

executing an integer shift operation for each integer in a resultant block of data by right-shifting to arrive at an integer solution block solving for b/a;

constructing two mantissa tables $M_1$ and $M_0$ as modifications of said mantissa A;

splitting the multiplication operations of b with mantissa A across the split mantissa tables $M_1$ and $M_0$ subject to shifting and addition; and wherein the bit-width of the operations is narrowed.

5. A method as recited in claim 4, wherein on processors having SIMD instructions configured for performing non-uniform shifting operations, conversion speed is enhanced by executing non-uniform SIMD right shifting of each integer in the resultant block of data by n places in response to values within look-up table M.

6. A method as recited in claim 4, wherein on processors having SIMD instructions not configured for performing non-uniform shifting operations, said integer-shift operation comprises:

modifying said table M into a set of mantissa A values subject to a fixed exponent, by left shifting each mantissa A entry by an amount equal to p−n wherein p is a constant and n is the original exponent value; and executing said shift operations, after said integer multiplication, during said quantization by performing an integer right shift for each integer in the resultant block of data by a fixed number of places p.

7. A method of performing integer divisions b/a during quantization of a multimedia bit-stream within a processor having single instruction multiple data (SIMD) instructions, without utilizing division instructions, comprising:

constructing a table M of numbers according to the value of 1/a for use during quantization;

loading data for SIMD instructions to operate on multiple data in a data packet in parallel within the same operation for executing the following;

finding corresponding values in said table for a particular value 1/a, associated with the division b/a, in said tables during quantization for each of the elements in the data block;

computing a result for said division value b/a for each integer b within the block of fixed integer set S and mantissa A using a combination of SIMD block multiplication and logical shifting without utilizing a division instruction; and wherein integers a and b belong to a fixed integer set S;

wherein said combination of said SIMD block multiplication and logical shifting executes the operation b/a= (b×(A<<(p−n)))>>p having the logical shift operation (>>) within said operation adapted for execution on a processor that does not support non-uniform logical shift operations; and wherein modifying said table M entries of mantissa A and exponent values n is performed according to the relation M(x)=(A(x)<<(p−n(x))) so that said shift operations in the block during quantization can be executed to the same number of places p.

8. A method as recited in claim 7, wherein said quantization provides for the conversion of a block of discrete cosine transform (DCT) coefficients into integers.

9. A method as recited in claim 7:

wherein said combination of said SIMD block multiplication and logical shifting executes the operation b/a= (b×A)>>n; and wherein the logical shift operation (>>) within said operation b/a=(b×A)>>n is configured for execution on a processor that supports non-uniform logical shift operations.

10. A method as recited in claim 7, wherein said method comprises performing MPEG-2 quantization according to the divisions c=b/a and f=e/d.

11. A method as recited in claim 10, wherein one pair of tables, comprising mantissa table A(x) and exponent table n(x), contain values across the range for both 1/a, and 1/d, utilized for performing the divisions c=b/a and f=e/d during MPEG-2 quantization.

12. A method as recited in claim 7, wherein said quantization is performed for an MPEG-2 protocol.

13. A method as recited in claim 12, wherein two integer divisions are represented by c=b/a and f=e/d, in which integer b represents discrete cosine transform (DCT) coefficients, integer a represents elements of the weighting matrix, integer e depends on division c, and integer d represents quantizer scales.

14. A method as recited in claim 13, wherein both integers a and d belong to a set [1,255].

15. A method of performing integer divisions b/a during quantization of a multimedia bit-stream within a processor having single instruction multiple data (SIMD) instructions, without the need of executing non-uniform shift instructions, comprising:

constructing a table M of mantissa A values and exponent n for a for use during quantization;

modifying said table M in which the mantissas are modified by right shifting in response to relation $M(x)=(A(x)<<(p-n(x)))$, wherein p is a constant;

loading data for SIMD instructions to operate on multiple data in a data packet in parallel within the same operation for executing the following;

finding a mantissa A within table M for 1/a for each element in the block of data; and computing value b/a according to the relation: $b/a=(b\times M)>>p$ across the block of integers using SIMD instructions.

16. A method as recited in claim 15, wherein said quantization provides for the conversion of a block of discrete cosine transform (DCT) coefficients into integers.

17. A method as recited in claim 15, wherein integers a and b belong to a fixed integer set S.

18. A method as recited in claim 15, wherein said set S comprises integers within the set [1,255].

19. A method as recited in claim 15, wherein said MPEG-2 quantization further comprises:

generating a mantissa table and exponent table for every integer m;

wherein said mantissa table and exponent table are generated by a search and m represents the number of bits for $M(x)$ for any $x \in [1,255]$; and continuing said generation by increasing m until sufficient precision is reached.

20. A method as recited in claim 19, wherein one pair of tables comprising values for 1/a, or equivalent, is utilized for executing two division conversions for b/a and e/d during MPEG-2 quantization as a result of the value 1/d, or equivalent, belonging within the same range of values 1/a.

21. A method as recited in claim 19, wherein said sufficient precision is attained when the final result of the two divisions is correct for any possible discrete cosine transform (DCT) coefficient b that is in the range from −2048 to 2047.

22. A method as recited in claim 21, wherein said generation terminates when m is equal to eighteen.

23. A method of converting a block of discrete cosine transform (DCT) coefficients into integers by dividing quantizer step size without using division operations during quantization of a multimedia bit-stream executed within a processor having single instruction multiple data (SIMD) instructions, comprising:

constructing a look-up table M for a range of quantization step values 1/a;

loading data for SIMD instructions to operate on multiple data in a data packet in parallel within the same operation for executing the following steps;

looking up in said look-up table M an integer value associated with a particular value of quantization step size 1/a for each element in the block;

performing integer multiplication for each integer b within the block of fixed integer set S and mantissa A using said SIMD instructions; and executing an integer shift operation for each integer in a resultant block of data by right-shifting to arrive at an integer solution block solving for b/a;

wherein on processors having SIMD instructions not configured for performing non-uniform shifting operations, said integer-shift operation comprises:

modifying said table M into a set of mantissa A values subject to a fixed exponent, by left shifting each mantissa A entry by an amount equal to p−n wherein p is a constant and n is the original exponent value; and executing said shift operations, after said integer multiplication, during said quantization by performing an integer right shift for each integer in the resultant block of data by a fixed number of places p.

* * * * *